US011982422B2

(12) United States Patent
Zhang et al.

(10) Patent No.: US 11,982,422 B2
(45) Date of Patent: May 14, 2024

(54) CORNER LAMP AND INTERCONNECTED LIGHTING SYSTEM

(71) Applicants: Self Electronics Co., Ltd., Zhejiang (CN); Wanjiong Lin, Zhejiang (CN); Self Electronics USA Corporation, Norcross, GA (US)

(72) Inventors: Chengke Zhang, Zhejiang (CN); Zai Le, Zhejiang (CN)

(73) Assignee: Sell Electronics Co., Ltd., Ningbo (CN)

( * ) Notice: Subject to any disclaimer, the term of this patent is extended or adjusted under 35 U.S.C. 154(b) by 0 days.

(21) Appl. No.: 18/319,225

(22) Filed: May 17, 2023

(65) Prior Publication Data

US 2023/0375147 A1 Nov. 23, 2023

(30) Foreign Application Priority Data

May 18, 2022 (CN) ......................... 202210543139.5

(51) Int. Cl.

| | |
|---|---|
| ***F21S 8/00*** | (2006.01) |
| ***F21S 2/00*** | (2016.01) |
| ***F21S 4/24*** | (2016.01) |
| ***F21V 3/00*** | (2015.01) |
| ***F21V 3/04*** | (2018.01) |
| ***F21V 17/16*** | (2006.01) |

(Continued)

(52) U.S. Cl.

CPC ............... *F21S 8/037* (2013.01); *F21S 2/005* (2013.01); *F21S 4/24* (2016.01); *F21V 3/00* (2013.01); *F21V 3/049* (2013.01); *F21V 17/164* (2013.01); *F21Y 2103/10* (2016.08); *F21Y 2115/10* (2016.08)

(58) Field of Classification Search

CPC .... F21S 8/037; F21S 2/005; F21S 4/22; F21S 4/24; F21S 4/26; F21S 4/28; F21V 3/049; F21V 15/015

See application file for complete search history.

(56) References Cited

U.S. PATENT DOCUMENTS 5,826,965 A * 10/1998 Lyons .................. B60Q 1/2611 362/240
2005/0068770 A1 * 3/2005 Sloan ..................... H05B 45/00 362/227

(Continued)

FOREIGN PATENT DOCUMENTS

WO WO-2010130141 A1 * 11/2010 ............... F21K 9/17

OTHER PUBLICATIONS

Machine translation of Ke, WO 2010/130141 A1, published Nov. 18, 2010 (Year: 2010).*

*Primary Examiner* — William N Harris
(74) *Attorney, Agent, or Firm* — Wang Law Firm, Inc.

(57) ABSTRACT

A corner lamp includes a lamp base, a light source module set on the lamp base, a first optical element set above the light source module, and an interconnection interface, the lamp base includes at least one corner section, the light source module is set on the outer wall of the corner section and extends along the corner direction; the present invention also discloses an interconnection lighting system; the corner lamp and interconnection lighting system of the present invention, the corner lamp itself can emit light, solving the problem of dark areas in the corner interconnection in the prior art.

10 Claims, 20 Drawing Sheets

(51) Int. Cl.
*F21Y 103/10* (2016.01)
*F21Y 115/10* (2016.01)

(56) References Cited

U.S. PATENT DOCUMENTS

| | | | | |
|---|---|---|---|---|
| 2010/0127139 | A1* | 5/2010 | Bauer | F21S 8/037 248/220.1 |
| 2020/0271305 | A1* | 8/2020 | Kay | F21K 9/20 |

* cited by examiner

CORNER LAMP AND INTERCONNECTED LIGHTING SYSTEM

RELATED APPLICATION

This application claims priority to Chinese Patent Application No. CN202210543139.5, filed on May 18, 2022, the entire specification of which is hereby incorporated by reference.

FIELD OF THE TECHNOLOGY

The present invention relates to lighting equipment, especially a corner lamp and interconnected lighting system.

BACKGROUND

Under the background of energy saving and environmental protection, LED lamps are more and more used in the fields of home and commercial lighting because of their high light efficiency and good light gathering performance, and with the continuous improvement of people's quality of life, people's demand for home and commercial lighting is also increasing accordingly.

When adjusting the scope of the lighting space, it is also necessary to adjust the irradiation range of the corresponding lamps. Especially in commercial lighting situations such as display cases, the required lighting range is determined by the number of specific display cases. Therefore, by setting the length of the LED strip light plug interconnection, we can easily and quickly adjust the lighting range.

However, most of the existing technologies are aimed at the interconnection of strip lights. When encountering a corner, it is generally necessary to use the adapter to realize the turn, which leads to dark areas in the location of the adapter, resulting in poor overall lighting effect. Therefore, it is necessary to propose a lighting method that can realize the interconnection of the corner without dark areas.

BRIEF SUMMARY OF THE TECHNOLOGY

In view of this, the present invention provides a corner lamp and an interconnected lighting system to solve the above technical problems.

a corner lamp includes a lamp holder, a light source module provided on the lamp holder, a first optical element provided above the light source module, and an interconnection interface. the lamp holder comprises at least one corner section, the light source module is provided on the corner section and extends in the direction of the corner.

Technical Effects of the Present Invention

The corner lamp and the interconnected lighting system of the present invention, the corner lamp itself can emit light to solve the problem of dark areas in the corner interconnection of the prior art.

BRIEF DESCRIPTION OF THE DRAWINGS

The following describes embodiments of the present invention in conjunction with the accompanying drawings, wherein.

DETAILED DESCRIPTION OF THE INVENTION

Figure 1:
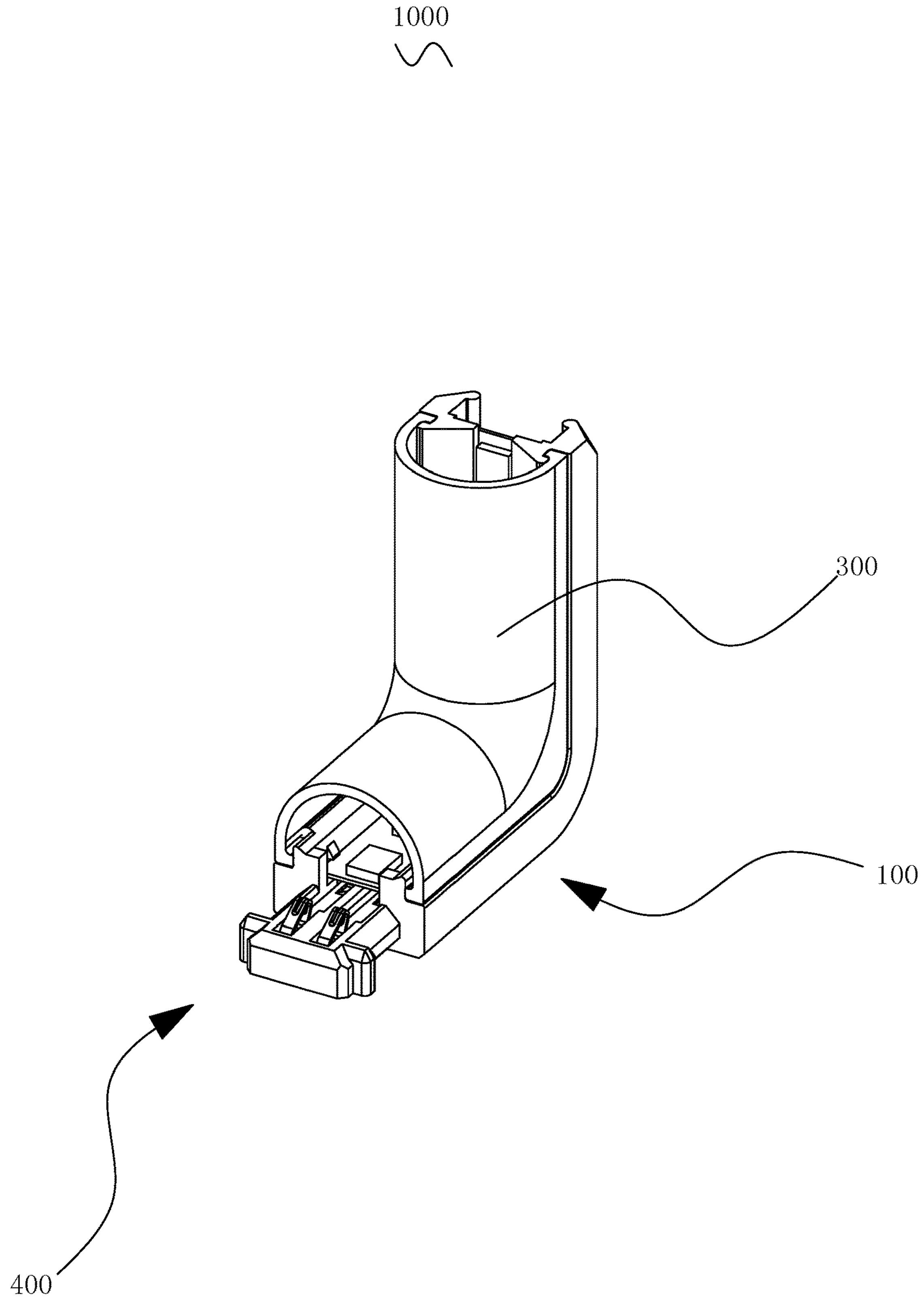
FIG. 1 is a schematic diagram of the three-dimensional structure of a corner lamp of embodiment 1.
Figure 2:
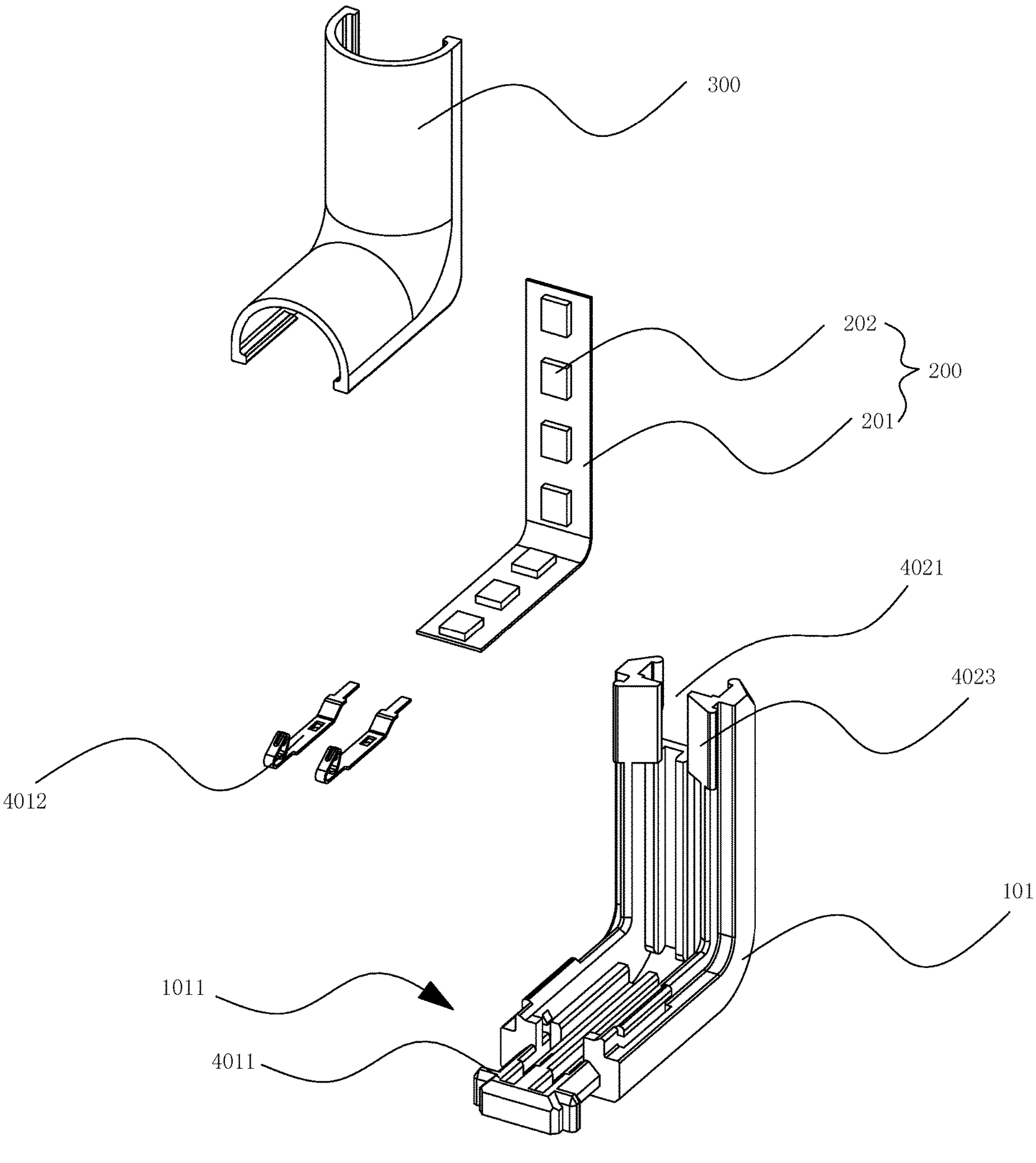
FIG. 2 is a schematic diagram of the explosion structure of the corner lamp of Embodiment 1.
Figure 3:
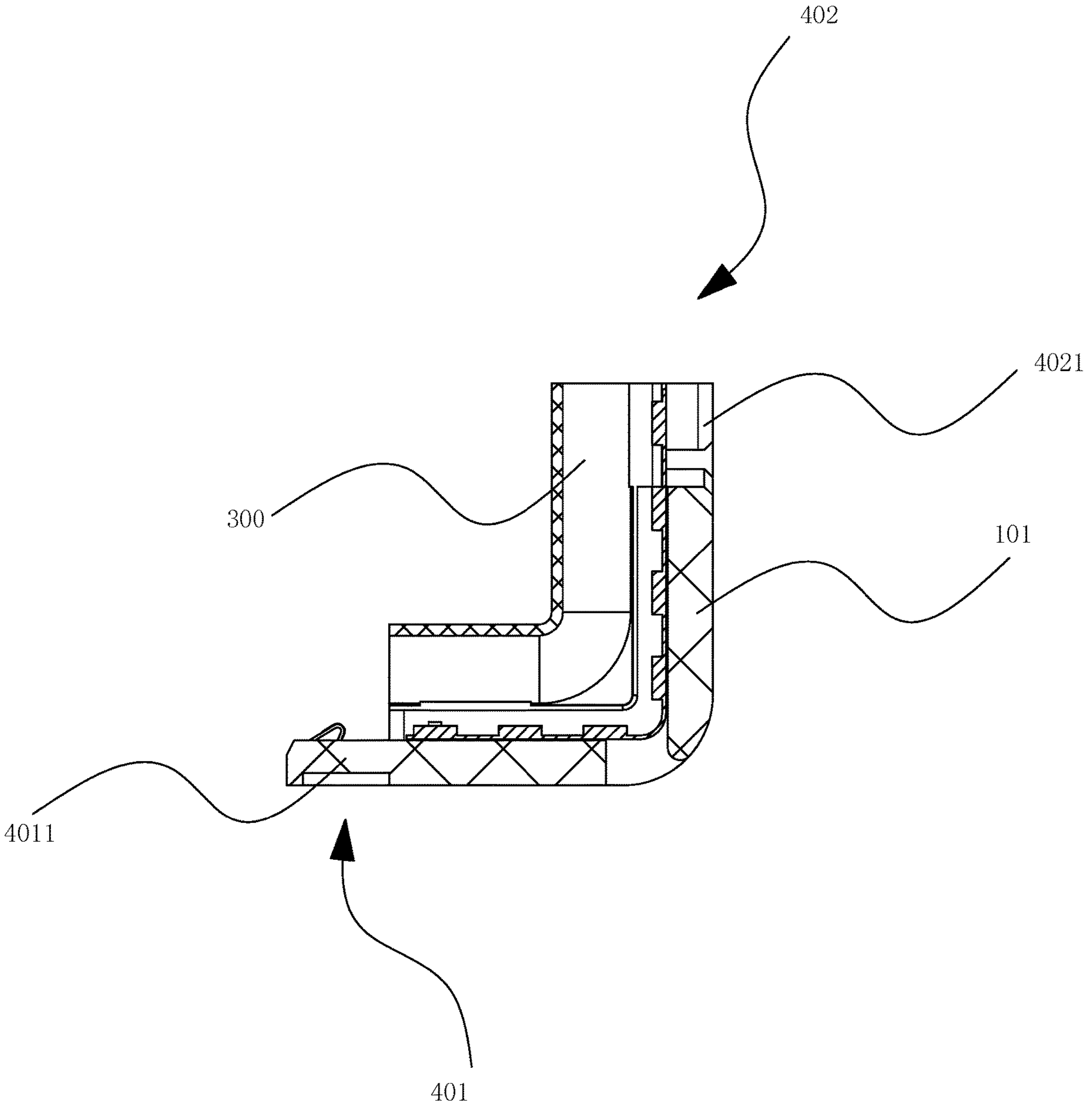
FIG. 3 is a schematic diagram of the corner lamp of Embodiment 1 in cross-sectional view.
Figure 4:
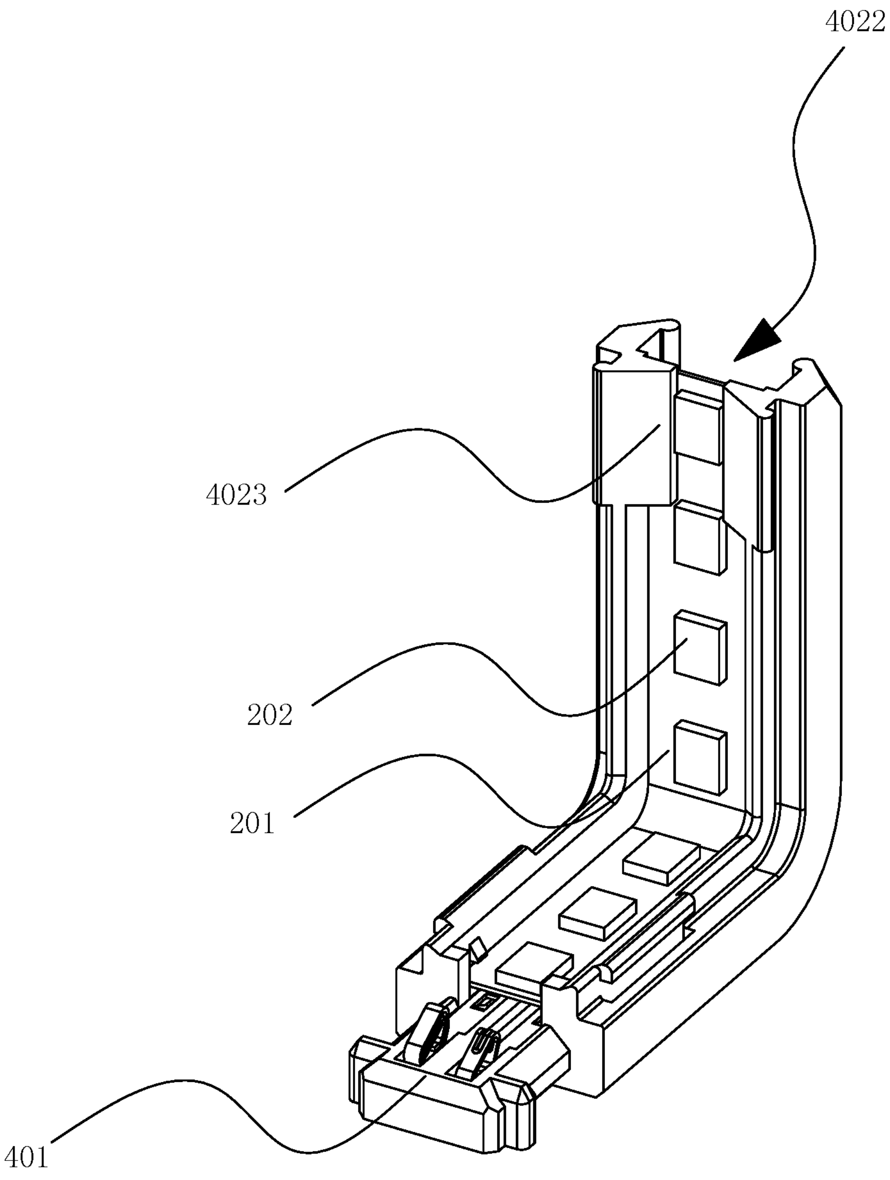
FIG. 4 is a schematic diagram of the structure of the corner lamp (with the lampshade removed) of Embodiment 1.
Figure 5:
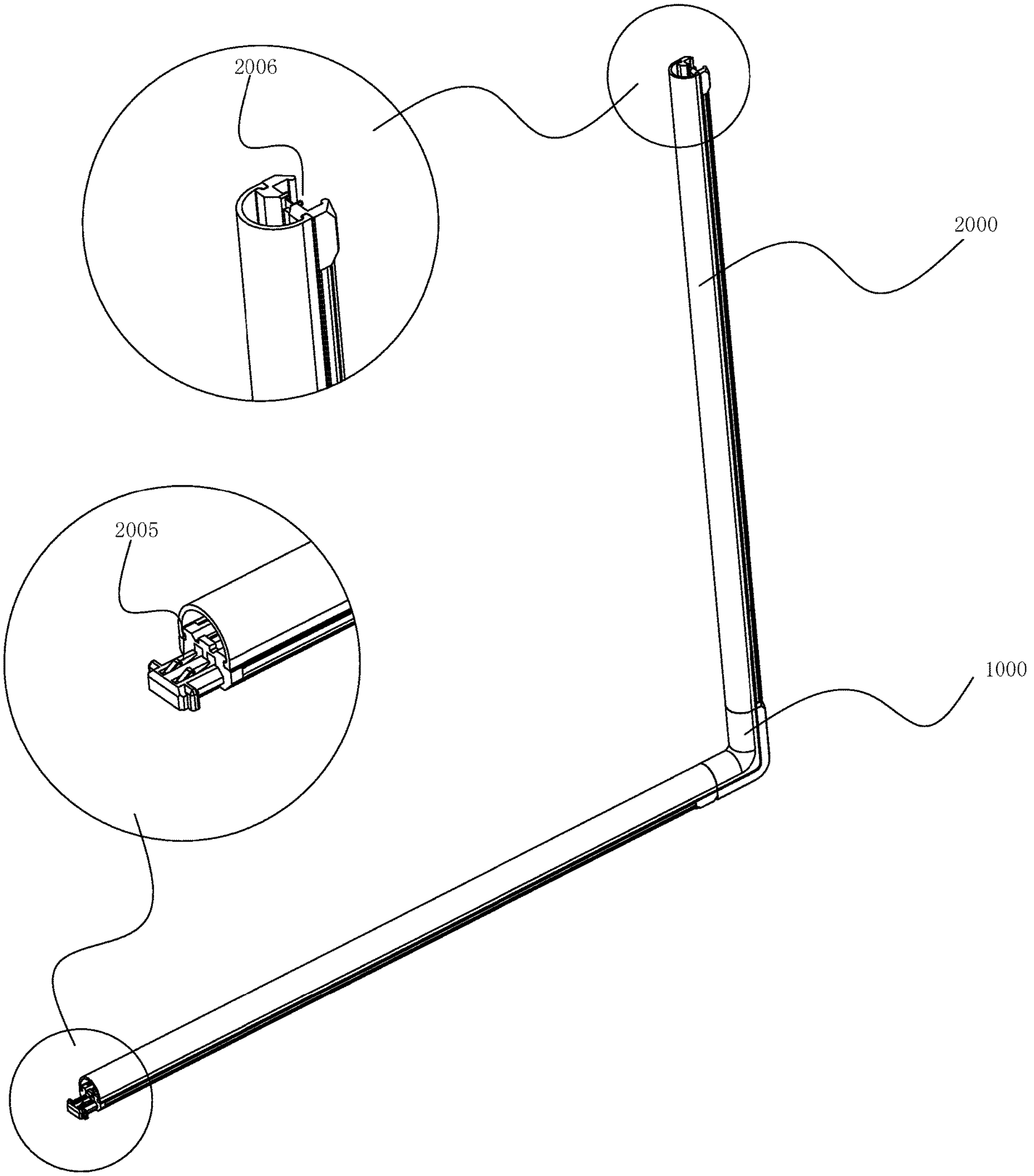
FIG. 5 is a schematic diagram of the structure of the interconnected lighting system of Embodiment 1.
Figure 6:
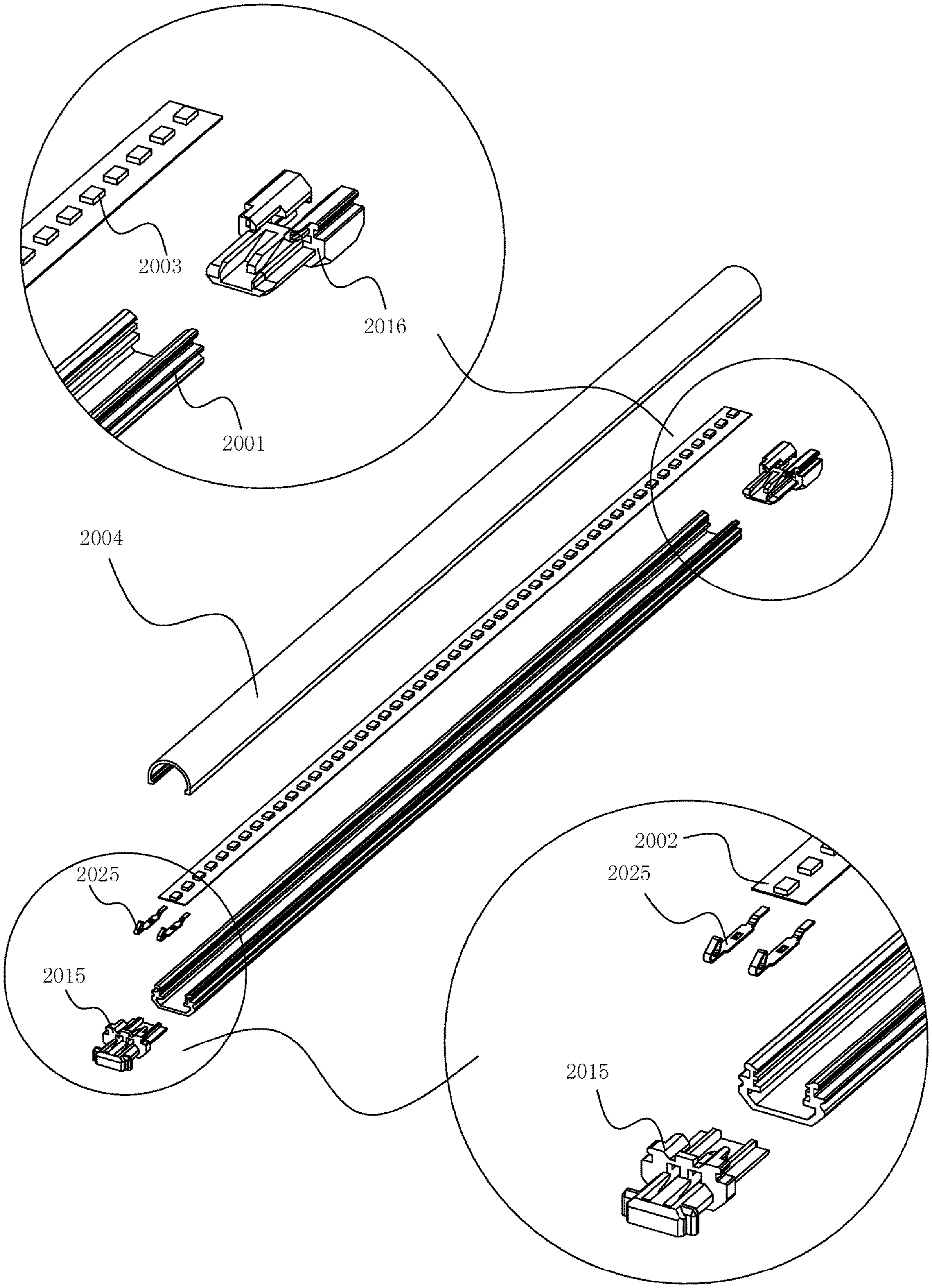
FIG. 6 is a schematic diagram of the exploded structure of the strip lamp interconnected with Embodiment 1.
Figure 7:
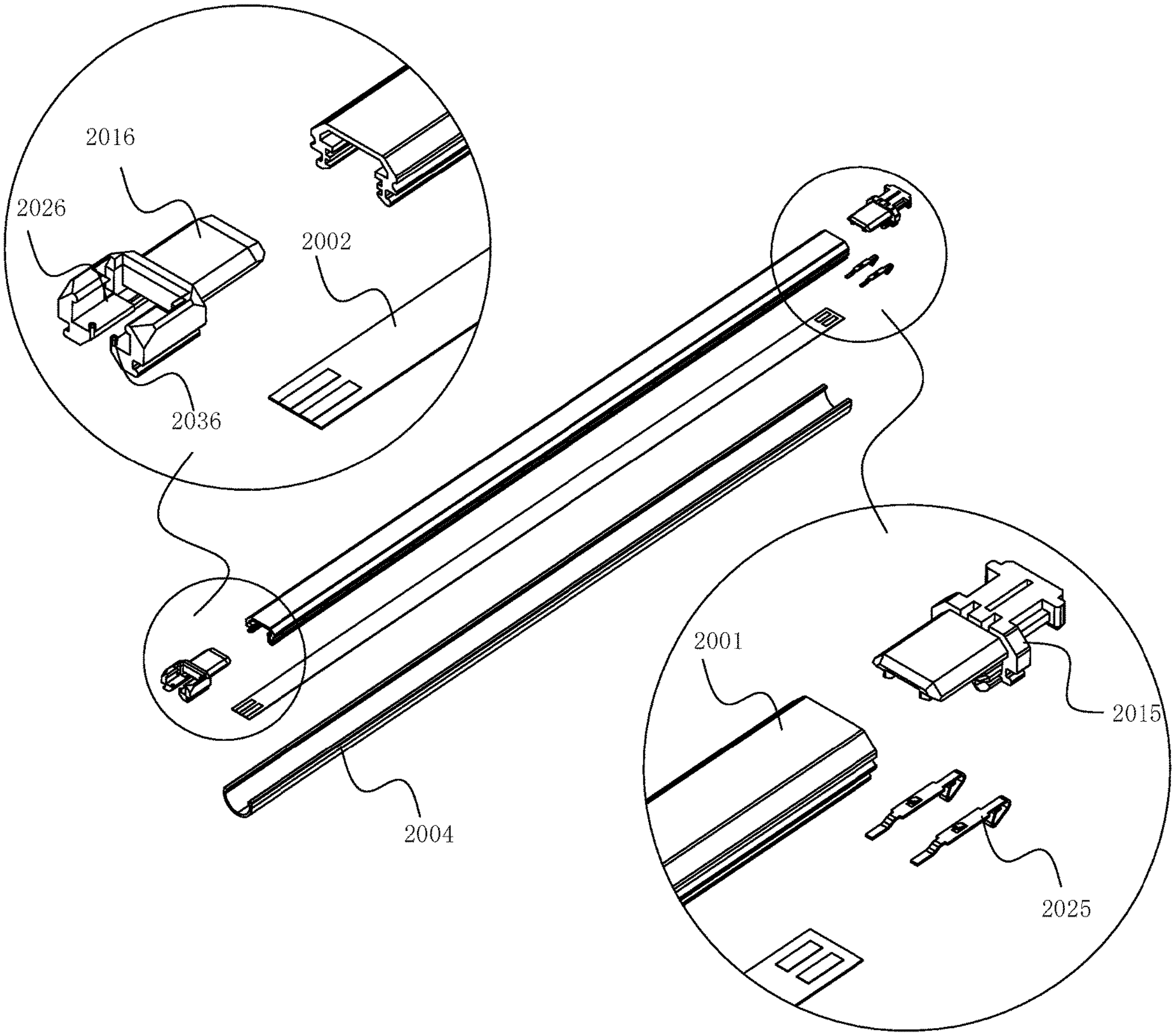
FIG. 7 is a schematic diagram of the exploded structure of the strip lamp of FIG. 6 at another angle.
Figure 8:
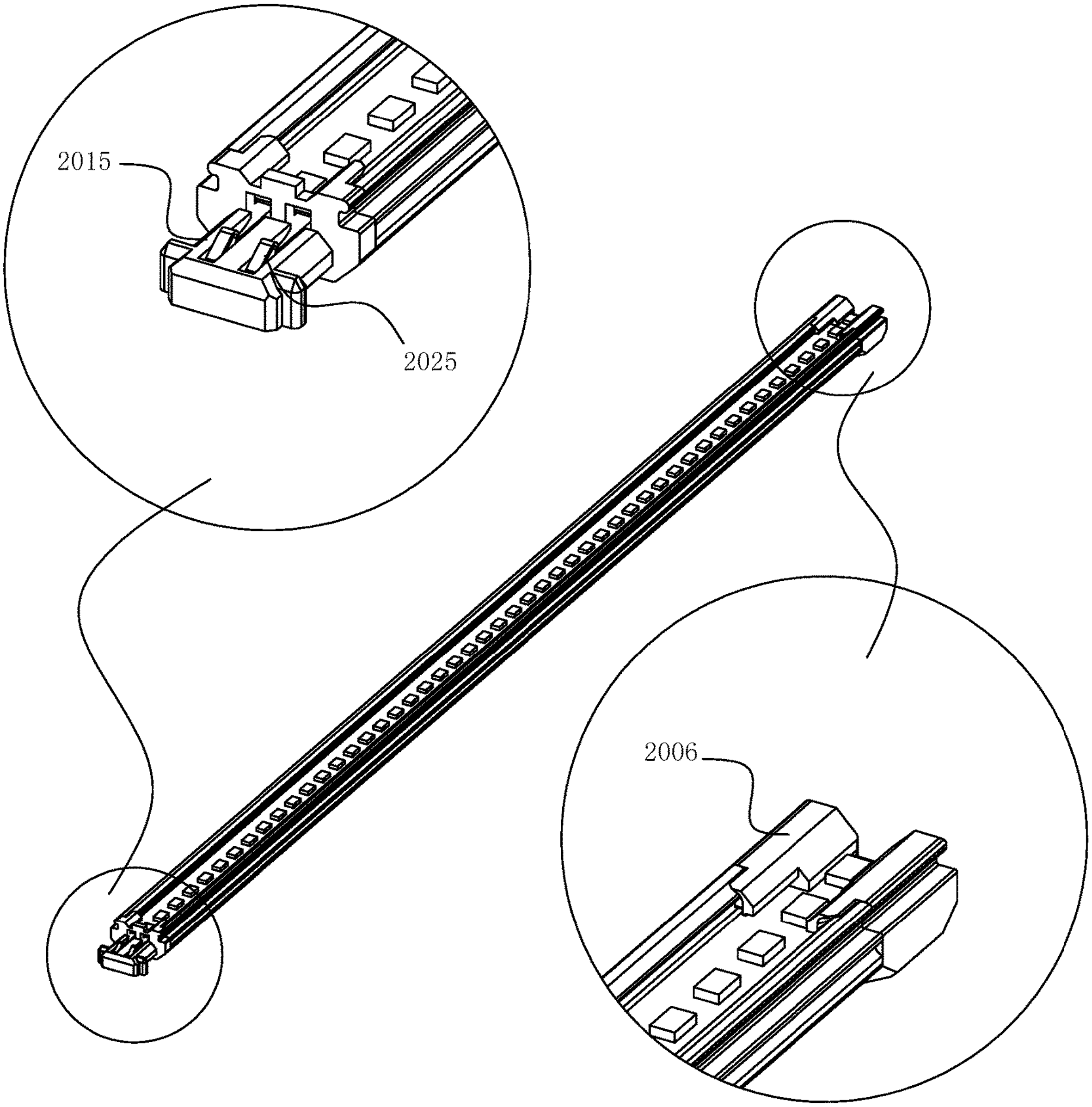
FIG. 8 is a schematic diagram of the structure of the strip lamp (with the lampshade removed) of FIG. 6.
Figure 9:
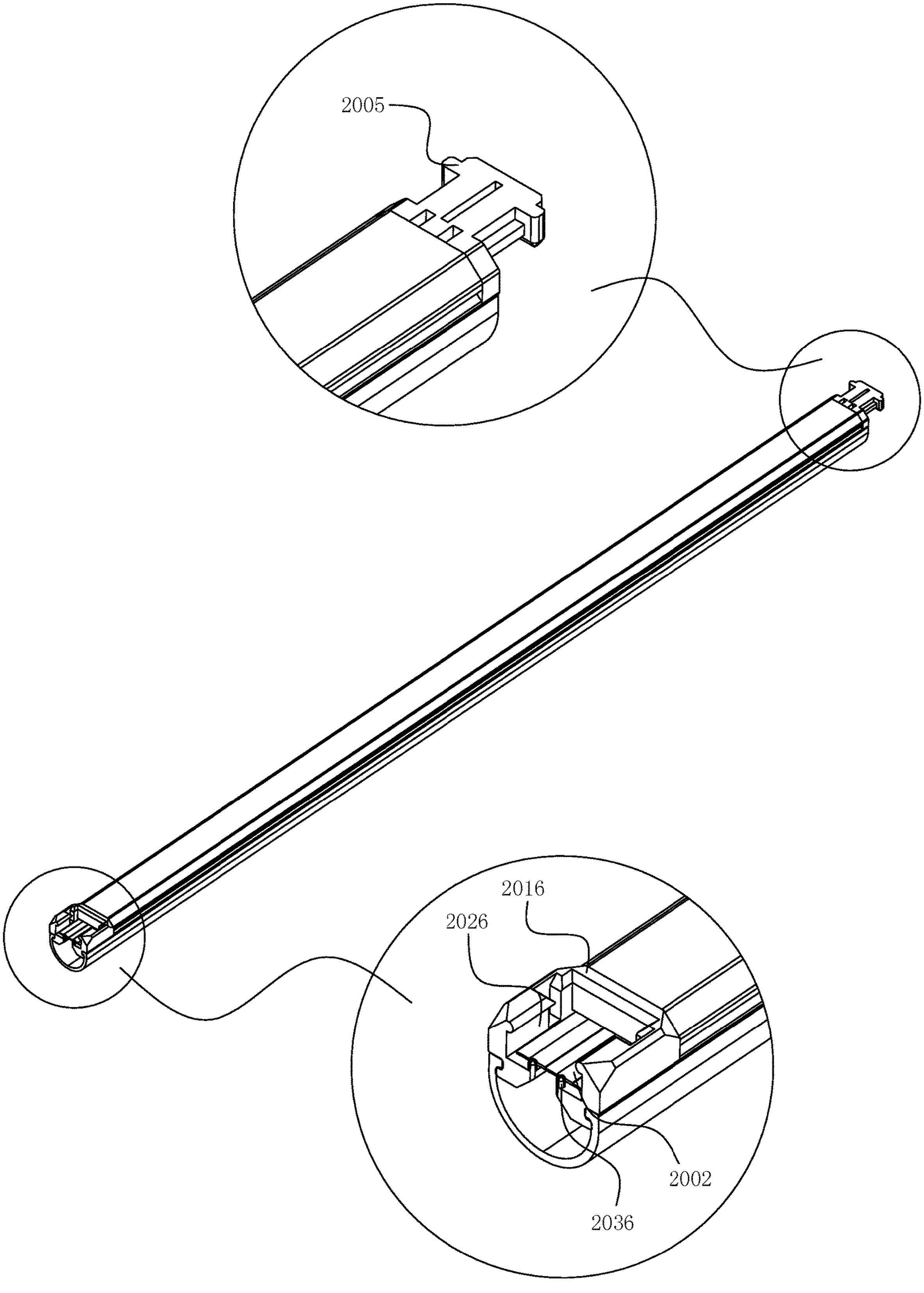
FIG. 9 is a schematic structural diagram of the strip lamp shown in FIG. 6.
Figure 10:
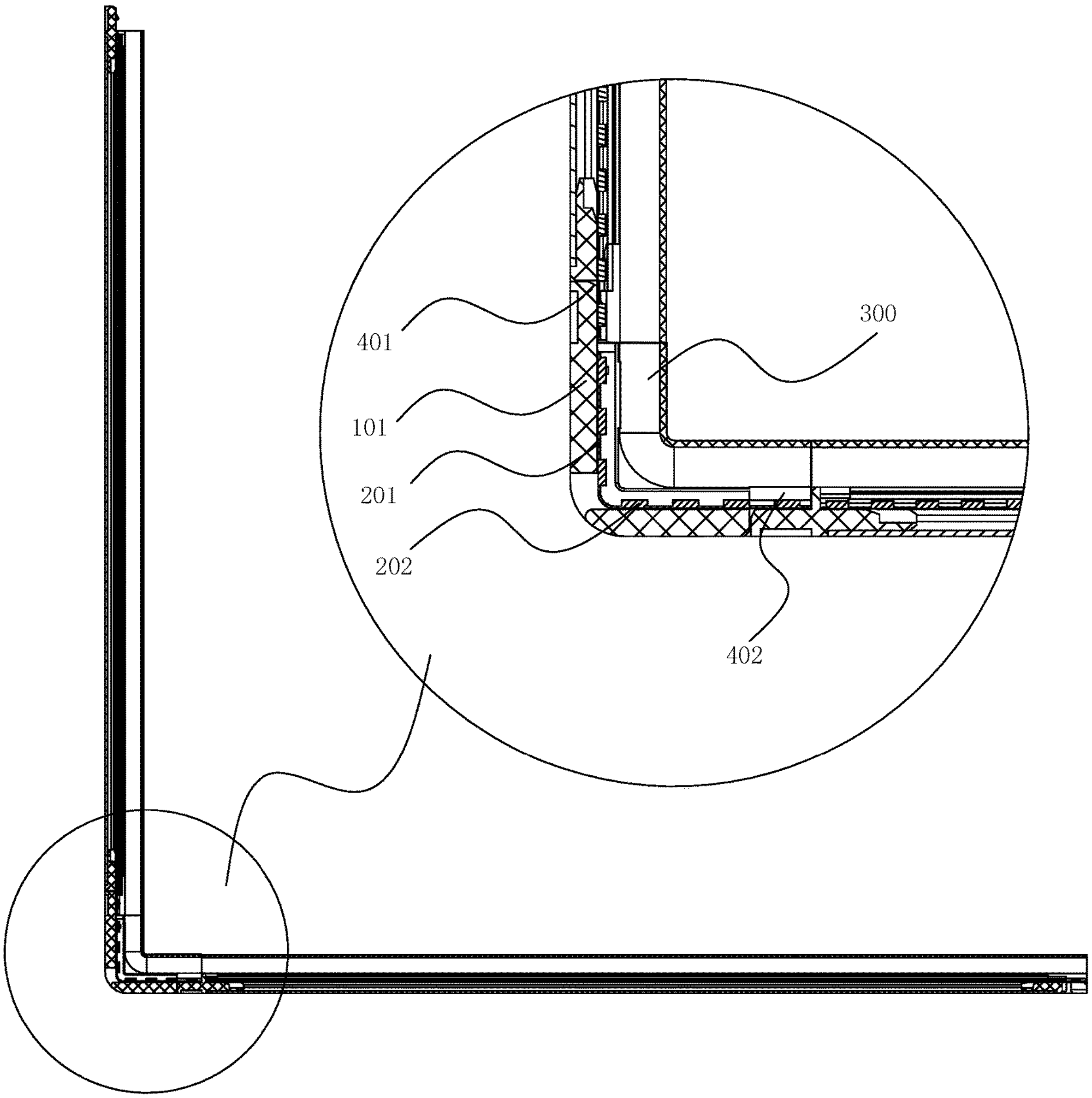
FIG. 10 is a schematic diagram of the cross-sectional structure of the interconnected lighting system of embodiment 1.
Figure 11:
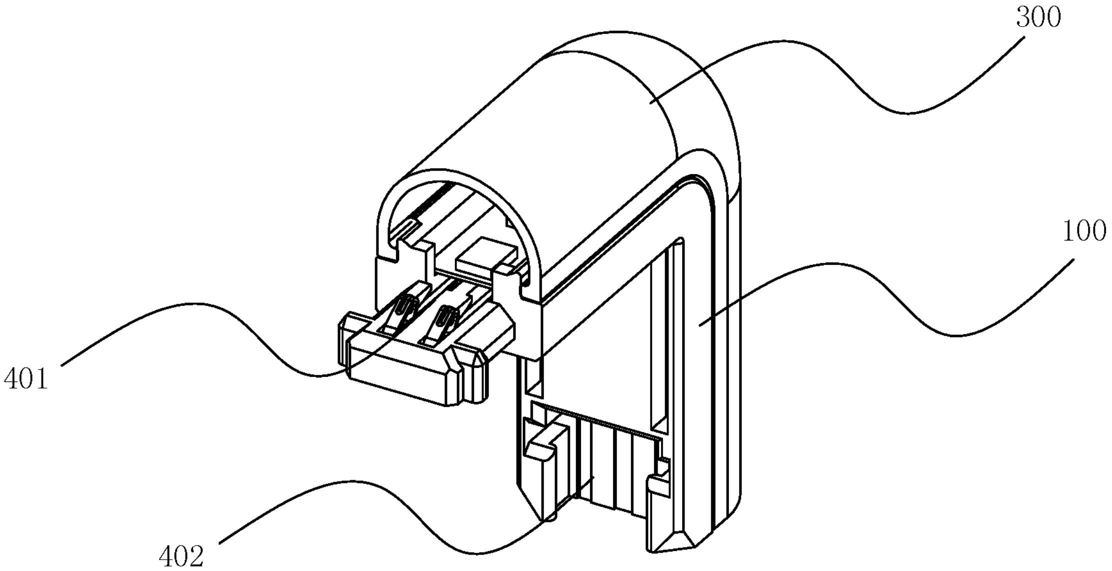
FIG. 11 is a schematic diagram of the three-dimensional structure of the corner lamp of Embodiment 2.
Figure 12:
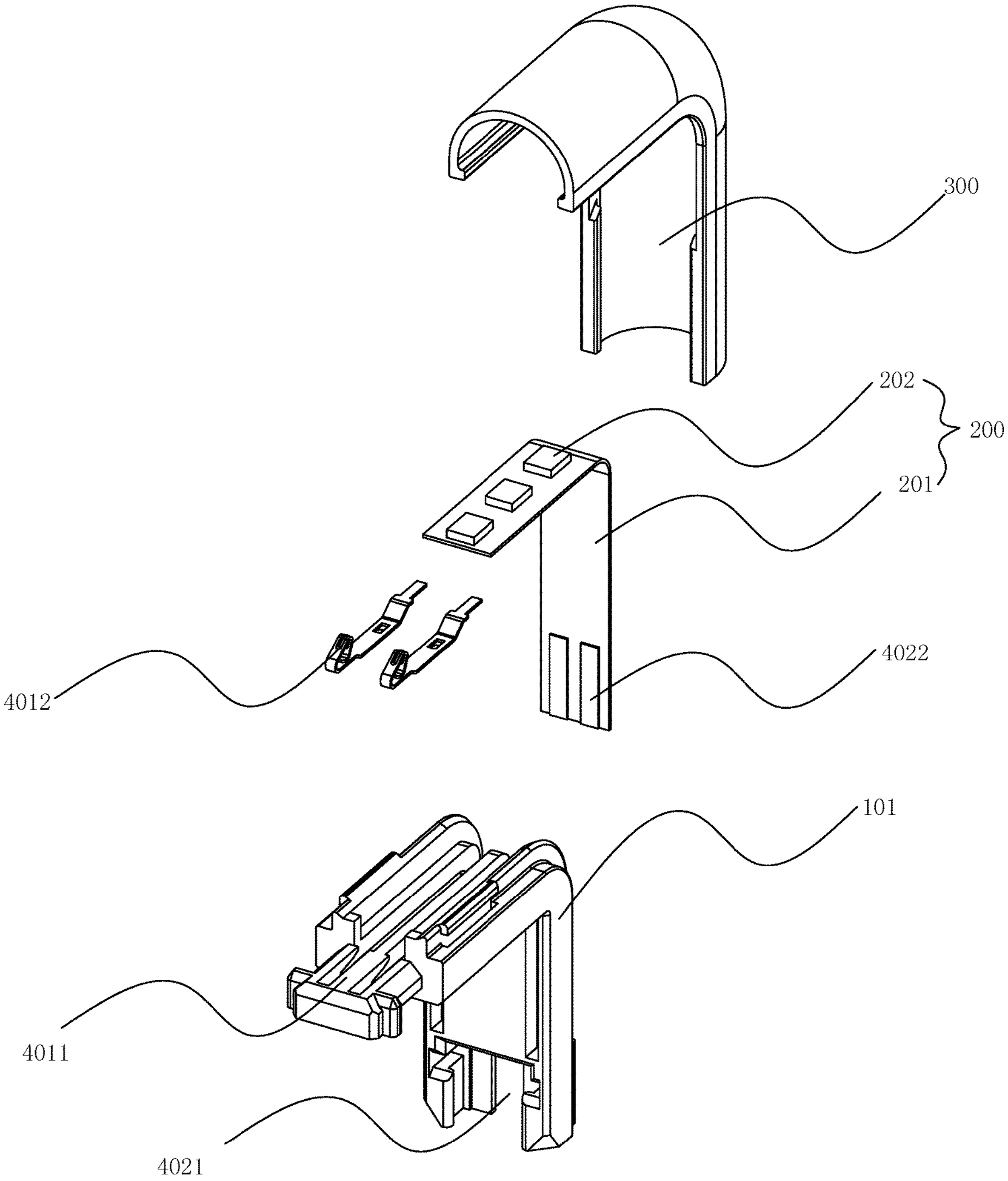
FIG. 12 is a schematic diagram of the explosion structure of the corner lamp of Embodiment 2.
Figure 13:
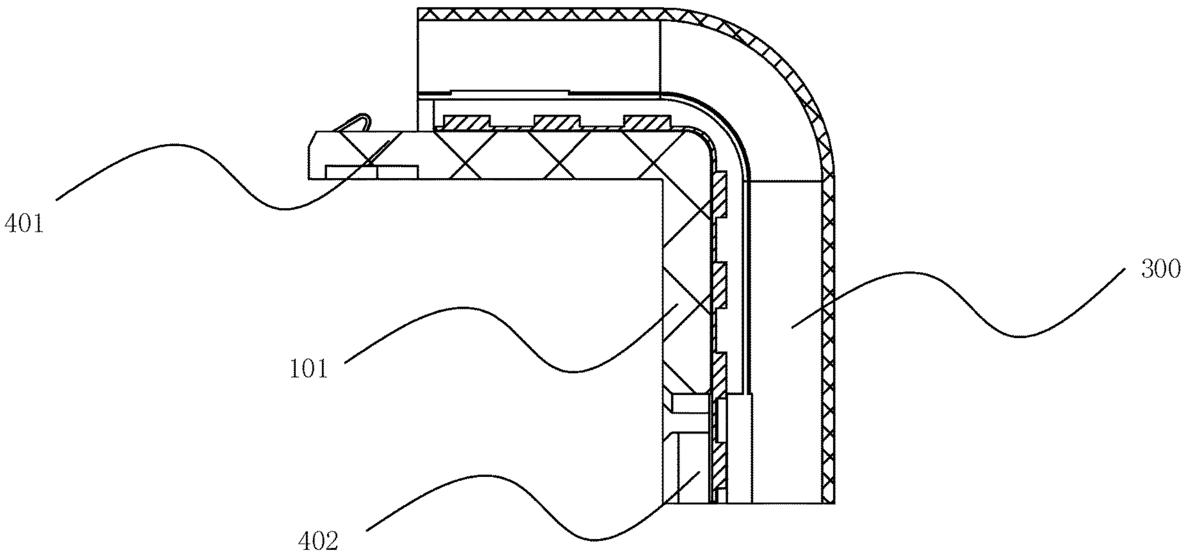
FIG. 13 is a schematic cross-sectional structure diagram of the corner lamp of Embodiment 2.
Figure 14:
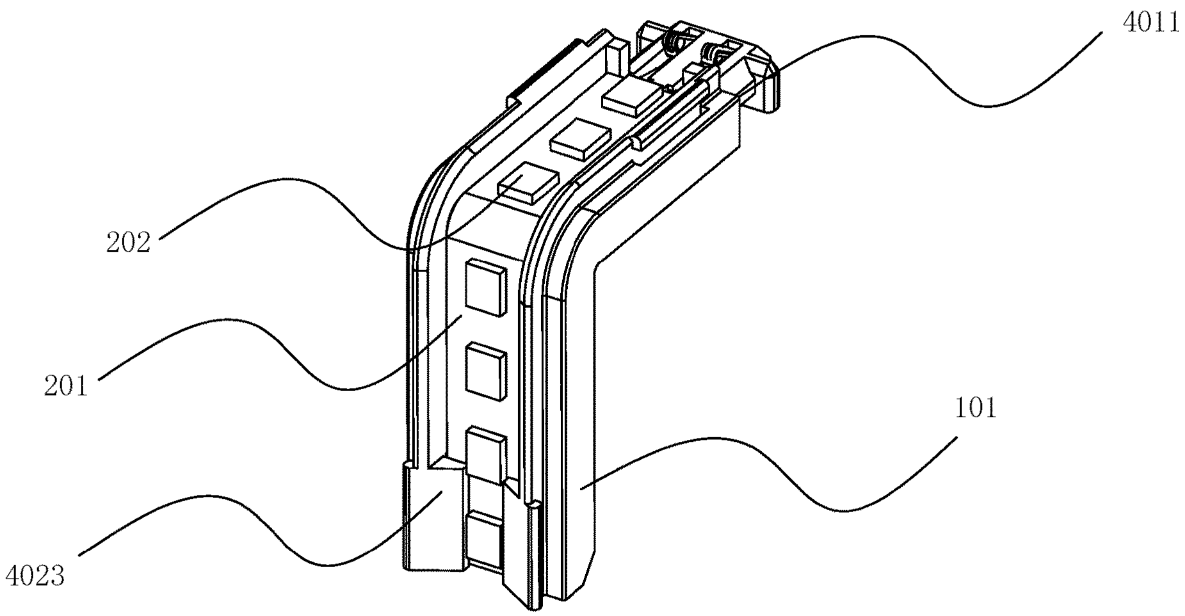
FIG. 14 is a schematic structural diagram of the corner lamp (with the lampshade removed) of Embodiment 2.

The following specific embodiments of the present invention will be described in further detail based on the accompanying drawings. It should be understood that the description of the embodiments of the present invention here is not intended to limit the protection scope of the present invention.

Embodiment 1

As shown in FIGS. 1 to 4, the corner lamp 1000 of this embodiment includes a lamp base 100, a light source module 200 set on the lamp base 100, a first optical element 300 set above the light source module 200, and an interconnection interface 400, the lamp base 100 includes at least one corner section 101, the corner section 101 is provided with the light source module 200 on the inner side of the corner section 101. The corner lamp itself can emit light, solving the problem of dark areas in corner interconnections in the prior art.

In this embodiment, the light source module 200 includes a circuit board 201 and a first light source chip 202 set on the circuit board 201. This type of structure of the light source module 200 is made in mature technology, easy to purchase. Further, the first light source chip 202 is an LED chip.

In this embodiment, the circuit board 201 is a flexible board. The flexible board can be bent at will, so that it can be bent and installed without segmentation.

The corner section 101 is provided with at least two outwardly extending ends 1011 on which the interconnection interface 400 is provided. Two interconnection interfaces 400 are provided to enable interconnection, and multiple ones are provided to also connect more lamps. In this embodiment, the interconnection interface 400 includes a first male plug 401 and a first female plug 402. The first male plug 401 and the first female plug 402 are both provided on the end part, thus making the interconnection more continuous.

In this embodiment, the first male plug 401 includes a first plug holder 4011 and a first conductive elastic member 4012; the end 1011 extends to form the first plug holder 4011, the first conductive elastic member 4012 is fixed on the first plug holder 4011, one end is electrically connected to the circuit board 201.

There are many structures of the male plug, in this embodiment, the first conductive elastic member 4012 formed by the bending of the conductive strip is used, the structure is simple and reliable connection.

In this embodiment, the exposed side of the first conductive elastic member 4012 is located on the same side as the first light source chip 202. This setting allows the end connected to the first conductive elastic member 4012 to be set on the back of the circuit board 201 for conductive interconnection, reducing dark areas.

In this embodiment, the first female plug 402 includes a first connection notch 4021 and a first contact conductive layer 4022; the first connection notch 4021 is provided at the bottom of the end 1011, the circuit board 201 extends to this first connection notch 4021; the first contact conductive layer 4022 is provided at the back of the circuit board 201 aligned with the area of the first connection notch 4021.

The above structure allows the interconnected male plug to snap in through the first connection notch 4021 to achieve a contact electrical connection, reducing the dark area while being more reliable than the lengthwise mating. In this embodiment, the snap structure is set to realize the connection between the first plug holder 4011 and the first connection notch 4021, and also a limiting structure can be set around the first connection notch 4021 to prevent the first plug holder 4011 from disconnecting in the length direction, and the connection is more reliable.

In this embodiment, the front side of the end 1011 is provided with an gap 4023 corresponding to the first connection notch 4021 to cover the side of the circuit board 201. The above structure prevents the flexible board from coming out of the lamp base 100 during the interconnection process.

The first optical element 300 is for light distribution and can be encapsulated lamps, which can be selected according to the need. In this embodiment, the first optical element 300 is a milky white lampshade. The structure is simple, the light effect is uniform, and the manufacturing cost is low.

In this embodiment, the opalescent lampshade is snap connected to the lamp holder 100.

In this embodiment, the corner section 101 is L-shaped, and the corner section 101 is provided with a light source module 200 on the inner side, which is suitable for mounting to the outer side of the corner section.

As shown in FIGS. 5 to 9, the interconnected lighting system of this embodiment includes a corner lamp 1000 and a strip lamp 2000 interconnected to the corner lamp 1000, and the strip lamp 2000 can continue to be interconnected to a desired length.

The male and female plugs at both ends of the strip lamp 2000 are similar in structure to the corner lamp 1000. The strip lamp 2000 includes a strip lamp holder 2001, a strip circuit board 2002 arranged on the strip lamp holder 2001, a second light source chip 2003 arranged on the strip circuit board 2002, a second optical element 2004 arranged above the second light source chip 2003, and a second male plug 2005 and a second female plug 2006 arranged at both ends of the strip light holder 2001. The second optical element 2004 can be a strip lamp shade.

In this embodiment, the strip circuit board 2002 is a flexible board and the back side is provided with a conductive layer 2012 extending along the length direction. The second male plug 2005 includes a second plug seat 2015 and a second conductive elastic component 2025. The second plug seat 2015 is connected with the strip lamp holder 2001, and the connection mode can be used for addictive matching connection, fastener connection, etc.; the second conductive elastic component 2025 is fixed on the second plug seat 2015, and one end is electrically connected with the strip circuit board 2001. The exposed surface of the second plug seat 2015 is arranged on the same side as the second light source chip 2003. The strip lamp holder 2001 can be made using profiles, easy to manufacture, and can be cut to length as required.

The second female plug 2006 includes a connection base 2016 and a second connection notch 2026, the connection base 2016 is connected to the strip light holder 2001, the connection mode can be interference fit connection, fastener connection, etc. The strip circuit board 2002 is extended and mounted to the connection base 2016; the second connection notch 2026 is provided at the bottom of the connection base 2016, the back of the strip circuit board 2002 is opposite to the second connection notch 2026. The front side of the attachment base 2016 is provided with a gap corresponding to the second attachment notch 2026 to cover the side of the strip circuit board 2002. The connection base 2016 is provided with a projection 2036 to limit the end of the strip circuit board 2002.

The second female plug 2006 of one strip lamp 2000 is interconnected with the first male plug 401 of a corner light 1000, and the second male plug 2005 of the other strip lamp 2000 is interconnected with the first female plug 402 of the corner light 1000 in a similar, press-and-click manner.

Embodiment 2

As shown in FIGS. 10 to 14, in this embodiment, the corner section 101 is provided with the light source module 200 on the outer side.

In this embodiment, the corner section 101 is L-shaped, the corner section 101 is provided with the light source module 200 on the outer side, suitable for mounting to the inner side of the corner section, and the structure and component composition are the same as in Embodiment 1.

In another embodiment, the corner section 101 is Y-shaped, when the corner section 101 has three inner sides where the light source module 200 can be fully or partially installed.

In another embodiment, the corner section 101 is cross-shaped, when the corner section 101 has four inner side which can be fully or partially installed light source module 200.

In another embodiment, the corner section 101 is V-shaped, the V-shape, i.e., the inner side is at an acute angle, and can accommodate mounting positions with different angles, allowing the light source module 200 to be mounted on the outer or/and inner side.

In another embodiment, the corner section 101 is T-shaped so as to form two inner sides and one outer side, allowing the light source module 200 to be mounted on the outer or/and inner side.

Embodiment 3

Figure 15:
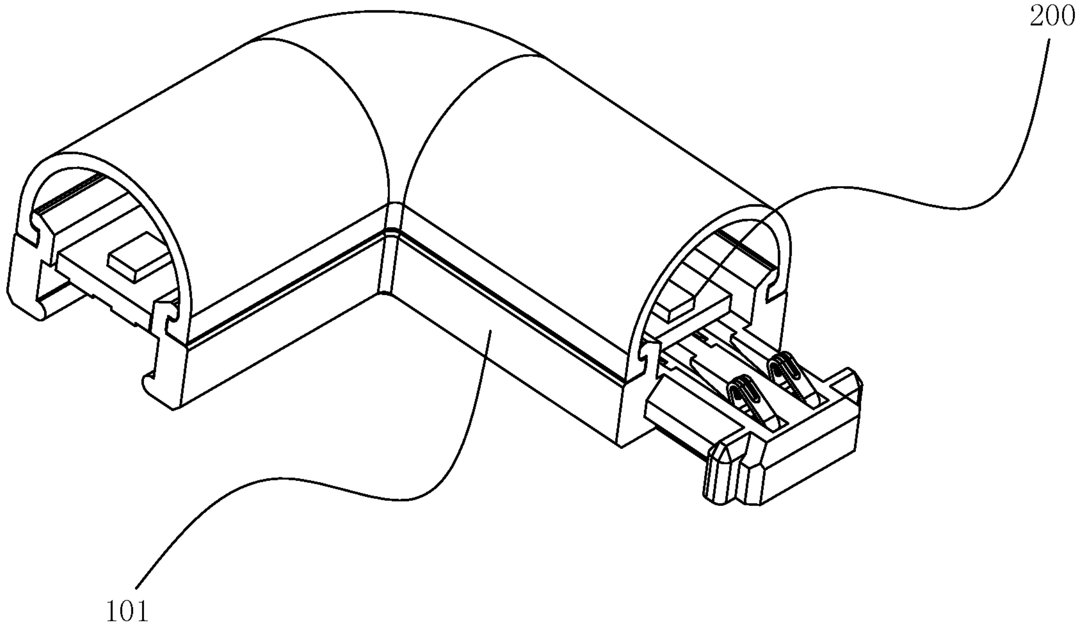
FIG. 15 is a schematic diagram of the three-dimensional structure of the corner lamp of Embodiment 3.
Figure 16:
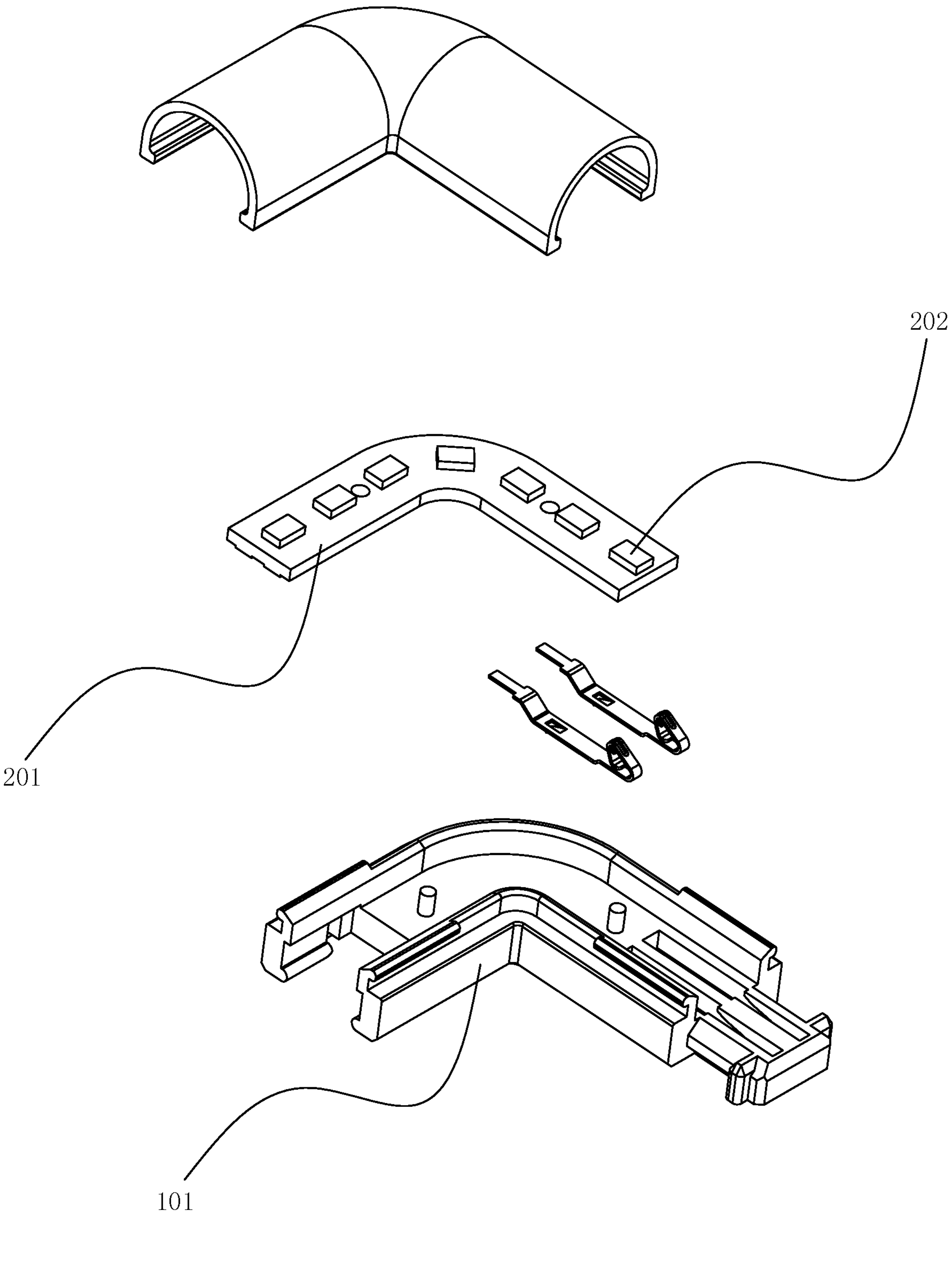
FIG. 16 is a schematic diagram of the explosion structure of the corner lamp of Embodiment 3.

As shown in FIGS. 15 and 16, unlike Embodiment 1 and Embodiment 2 where the light source module 200 is provided on the outer or/and inner side of the corner section 101, in this embodiment, the light source module 200 is provided on both sides of the corner section 101, either on only one side or both sides, and in this embodiment, on a single side. The corner section 101 of this embodiment is L-shaped.

In this Embodiment, the light source module 200 includes circuit board 201 and the first light source chip 202 set on the circuit board 201, except for the light source module 200 set in a different position, the rest of the structure is similar to Embodiment 1 and Embodiment 2, but because the light source module 200 in this Embodiment is set on both sides, the overall is in horizontal state, so the circuit board 201 does not need to be bent, the ordinary hard board can be choose.

Embodiment 4

Figure 17:
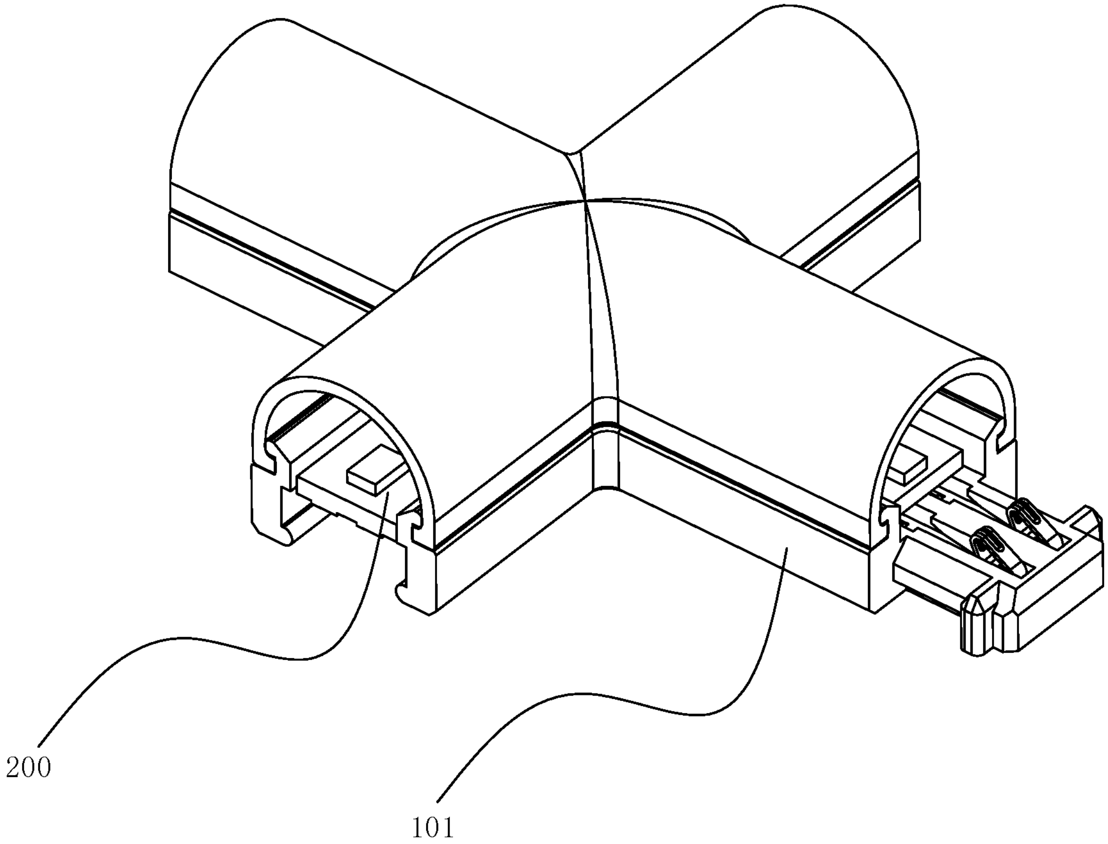
FIG. 17 is a schematic diagram of the three-dimensional structure of the corner lamp of Embodiment 4.
Figure 18:
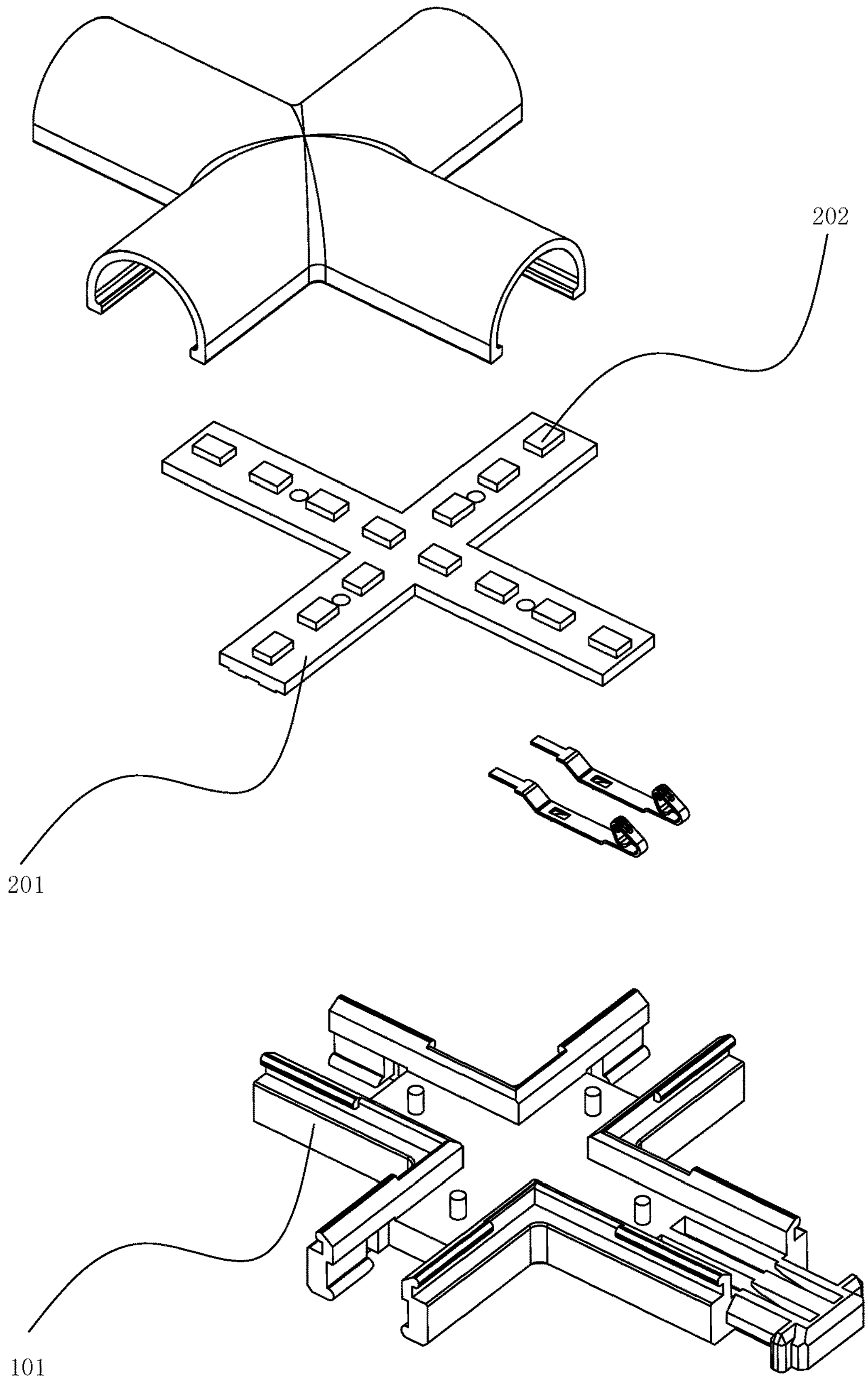
FIG. 18 is a schematic diagram of the explosion structure of the corner lamp of Embodiment 4.

As shown in FIGS. 17 and 18, the corner section 101 of this embodiment is cross-shaped, and the light source module 200 is provided on both sides of the corner section 101, either only on one side or on both sides, and in this embodiment, it is provided on one side.

Embodiment 5

Figure 19:
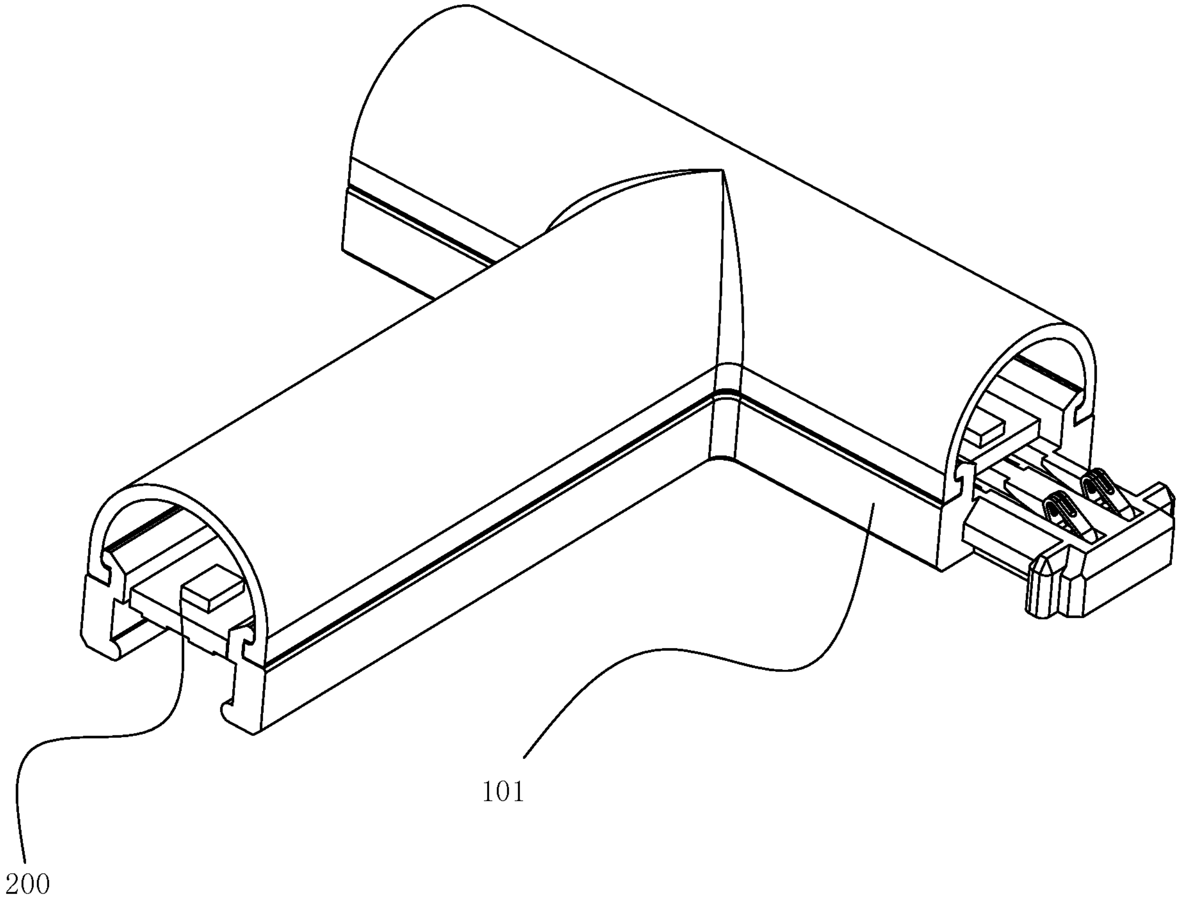
FIG. 19 is a schematic diagram of the three-dimensional structure of the corner lamp of Embodiment 5.
Figure 20:
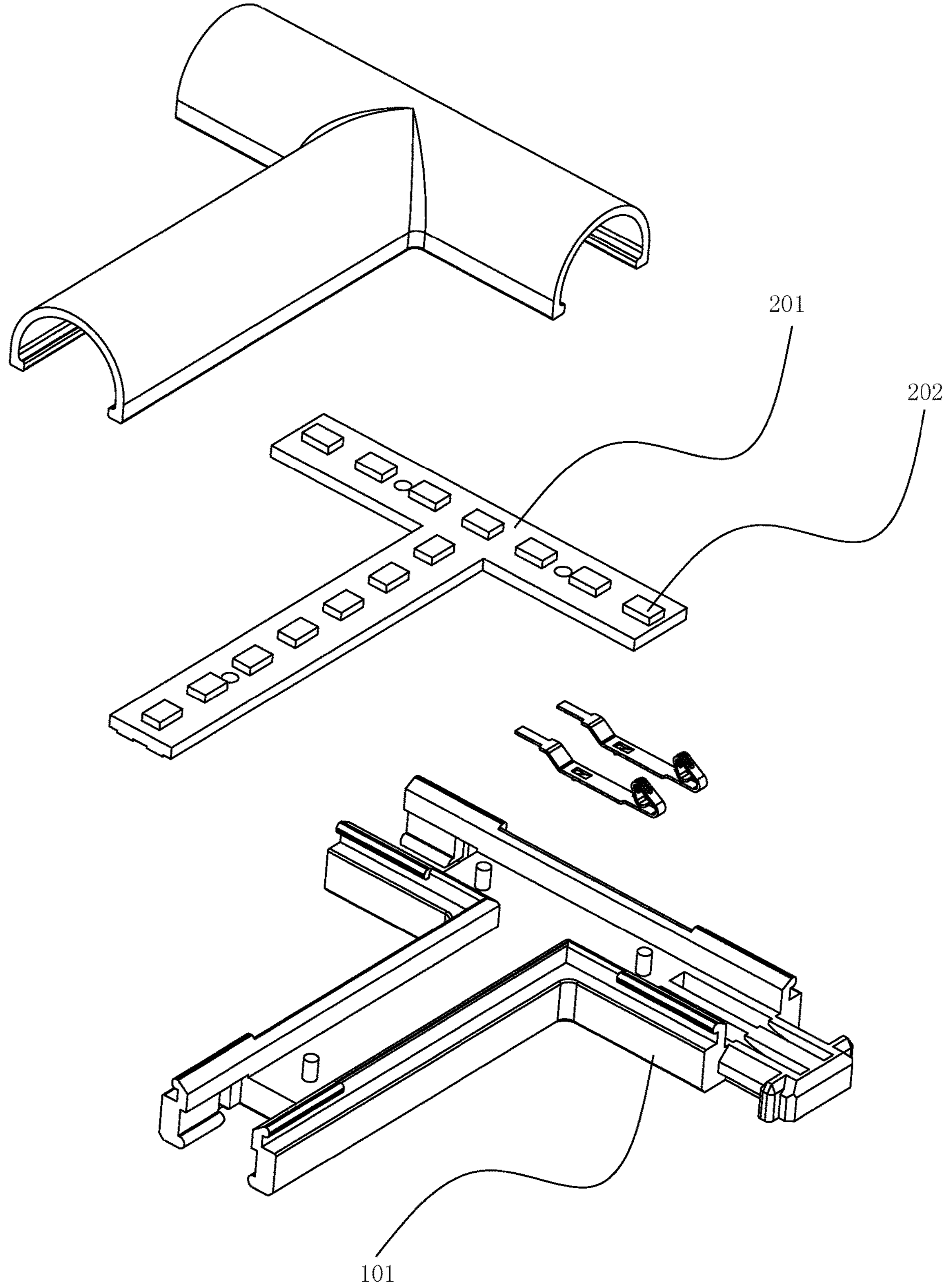
FIG. 20 is a schematic diagram of the explosion structure of the corner lamp of Embodiment 5.

As shown in FIGS. 19 and 20, the corner section 101 of this embodiment is T-shaped, and the light source module 200 is provided on both sides of the corner section 101, either only on one side or on both sides, and in this embodiment, it is provided on one side.

In another embodiment, the corner section 101 is V-shaped, i.e. the inner side is at an acute angle, which can accommodate installation positions with different angles, and can be set only on one side or both sides.

The above are only preferred embodiments of the present invention, and are not intended to limit the protection scope of the present invention. Any modifications, equivalent replacements or improvements within the spirit of the present invention are covered by the present invention within the scope of the claims.

What is claimed is:

1. A corner lamp (1000) comprising a lamp holder (100), a light source module (200) provided on the lamp holder (100), a first optical element (300) provided above the light source module (200), and an interconnection interface (400), characterized in that the lamp holder (100) comprises at least one corner section (101), the light source module (200) being provided on the corner section (101) and extending along the corner section;

wherein the light source module (200) comprises a circuit board (201) and a first light source chip (202) provided on the circuit board (201);

the corner section (101) is provided with at least two outwardly extending ends (1011) on which the interconnection interface (400) is disposed;

the interconnection interface (400) comprises at least one first male plug (401) and one first female plug (402), the first female plug (402) comprises:

a first connection notch (4021), provided at a bottom of a first end of the at least two outwardly extending ends (1011), the circuit board (201) extending into the first connection notch (4021);

a first contact conductive layer (4022), set on a reverse side of the circuit board (201) and aligned with a gap (4023) in the first connection notch (4021).

2. The corner lamp (1000) according to claim 1, wherein the light source module (200) is provided on one or more of an inner side and/or an outer side of the corner section (101).

3. The corner lamp (1000) according to claim 1, wherein the circuit board (201) is a flexible board.

4. The corner lamp (1000) according to claim 1, wherein the first male plug (401) comprises a first plug holder (4011) positioned at a second end of the at least two outwardly extending ends (1011), the second end being externally formed at the first plug holder;

a first conductive elastic member (4012), fixed to the first plug holder (4011), electrically connected at one end to the circuit board (201).

5. The corner lamp (1000) according to claim 4, wherein an exposed surface of the first conductive elastic member (4012) is located on the same side of the corner section as the first light source chip (202).

6. The corner lamp (1000) according to claim 1, wherein the first end is provided with an indentation on a front side corresponding to the first connection notch (4021) to cover a side edge of the circuit board (201).

7. The corner lamp (1000) according to claim 1, wherein the first optical element (300) is a milky white lampshade.

8. The corner lamp (1000) according to claim 7, wherein the milky white lampshade is snap connected to the lamp holder (100).

9. The corner lamp (1000) according to claim 1, wherein the corner section (101) is L-shaped, Y-shaped, cross-shaped or V-shaped.

10. An interconnected lighting system comprising at least one corner lamp (1000) as claimed in claim 1 and a strip lamp (2000) interconnected with the corner lamp (1000).

* * * * *